United States Patent [19]

Hill et al.

[11] 3,978,292

[45] Aug. 31, 1976

[54] RINGING CONTROL CIRCUITRY WITH SHARED RINGING LOOP CURRENT DETECTOR

[75] Inventors: Donald Gifford Hill; Theras Gordon Lewis, both of Boulder; Patrick Alban Vachon, Arvada, all of Colo.

[73] Assignee: Bell Telephone Laboratories, Incorporated, Murray Hill, N.J.

[22] Filed: Nov. 7, 1974

[21] Appl. No.: 521,651

[52] U.S. Cl............................. 179/18 HB; 179/18 J
[51] Int. Cl.²....................................... H04M 19/02
[58] Field of Search...................... 179/18 HB, 18 J

[56] References Cited
UNITED STATES PATENTS

| | | | |
|---|---|---|---|
| 3,059,058 | 10/1962 | Abbott | 179/18 HB |
| 3,291,916 | 12/1966 | Jorgensen | 179/18 HB |
| 3,312,787 | 4/1967 | Jorgensen | 179/18 HB |
| 3,350,508 | 10/1967 | Swanson | 179/18 |
| 3,378,650 | 10/1968 | Goeller | 129/175.2 |
| 3,443,033 | 5/1909 | Louis | 179/18 HB |
| 3,492,436 | 1/1970 | Feiner et al. | 179/18 |
| 3,492,437 | 1/1970 | Feiner | 179/18 |
| 3,752,924 | 8/1973 | Freimanis | 179/84 R |
| 3,821,484 | 6/1974 | Sternung | 179/18 J |

Primary Examiner—Thomas A. Robinson
Assistant Examiner—E. Matt Kemeny
Attorney, Agent, or Firm—F. W. Padden

[57] ABSTRACT

A time division switching system is disclosed having a plurality of telephone line circuits and common control circuits for switching calls over a time division communication bus. Ringing loop current detectors are shared by groups of the line circuits for detecting call answer signals during active ringing on a call and for controlling the line circuits to interrupt, or trip, the ringing upon a called party answer. Each group of the line circuits is permanently connected to a ringing current supply via an individual one of the loop current detectors. Each line circuit includes ringing control circuitry operated and released by the common control circuits for connecting ringing current to a called line during an active ringing interval and for disconnecting it during a silent interval of the ringing cycle. The circuitry is responsive to a detection of a called station answer signal by the shared loop current detector for immediately tripping ringing. Apparatus is also provided in the circuitry for sensing answer signals during the silent intervals and for generating switchhook status signals during both the silent and active ringing intervals.

14 Claims, 3 Drawing Figures

RINGING CONTROL CIRCUITRY WITH SHARED RINGING LOOP CURRENT DETECTOR

BACKGROUND OF THE INVENTION

This invention relates to incoming call signaling facilities for communication systems and particularly to circuitry for controlling single and plural phase incoming call ringing through communication line circuits. The invention further relates to line circuit ringing arrangements cooperating with time-shared call answer detection and ring tripping control circuitry for incoming call ringing over paths independent of a main communication switching network.

It has long been a common practice in the telephone industry to alert a called station to an incoming call by ringing a bell of the telephone instrument. Typically, the ringing occurs in cycles, each of which illustratively comprises an active interval of 1-second duration followed by a 3-second silent period. Such ringing is known in the art as noncoded ringing. The silent and active ringing intervals are slightly different for coded ringing which is widely used on multiparty lines and involves multiburst of active ringing intervals. The cycles for both coded and noncoded ringing are recurrent until the incoming call is answered or the call is abandoned. When the call is answered, ringing is terminated, or tripped, as soon as practicable to preclude a transmission of high level ringing signals through the telephone receiver to the answering party.

A problem in many prior art telephone systems is that the call answer and ring tripping circuitry must be uniquely dedicated and assigned to each called station for the entire duration of an incoming call even though it is only functional for a small percentage of the call holding time. Such circuitry is, in a substantial percentage of commercially operating telephone systems, customarily integrated into a trunk circuit which supplies ringing power to a called line via a switching network. The trunk circuit generally receives the incoming call and controls the entire ringing operation.

Each such trunk circuit is generally equipped with apparatus for activating one of a group of ringing selection switches to select an appropriate code and phase of ringing power for periodically actuating the ringer of the called telephone. The call answer detection and ring tripping circuitry in each trunk circuit is frequently a relay, or equivalent device, which is connected to the called telephone line for the recurrent cycles of silent and active ringing intervals and for sensing D.C. loop current flow over the line resultant from a called party answer. Upon detecting such loop current, the ring trip circuitry is effective to interrupt further ringing of the called station. Thereafter, the call answer and ring trip circuitry remains inactive and out-of-service for the remainder of the call. The inactivity and out-of-service factors obviously result in inefficient uses of call answer and ring trip circuitry.

In an endeavor to overcome the inefficient dedication of call answer detection and ring tripping circuitry, the art progressed in recent years to the extent that such circuitry is sometimes divorced from trunk circuits and segregated into ringing control circuits. Each of the latter circuits is switchable onto call connections to perform the entire ringing control job including the detection of a called party answer and the ring trip control functions. Importantly, after these functions are completed, the control circuit is automatically released from call connections before call conversation commences and is then made available for serving another call. Such an arrangement is disclosed, for example, in L. F. Goeller, Jr., U.S. Pat. No. 3,378,650, issued Apr. 16, 1968.

A disadvantage of the Goeller arrangement is that the common control equipment must establish several distinct connections through a switching network. One such connection is to a ringing control circuit for the ringing job. A subsequent connection is to a reserved trunk circuit for call conversation. Such an approach requires many common control equipment work operations to hunt, test and establish the network connections and undesirably requires separate network channel allocations especially for the ringing job.

The need for the latter work operations and special ringing channel allocations has been reduced by another innovation in the art as disclosed in A. Feiner, U.S. Pat. No. 3,492,437 of Jan. 27, 1970. Advantageously, Feiner discloses a ringing control circuit which is time shared by a plurality of trunk circuits and which is connectable onto the same network connections as the trunk circuits for performing the ringing job. The Feiner innovation enables a call answer detector and ring trip control circuit to be shared among a plurality of trunk circuits during active ringing which is time spaced for each sharing circuit. Each such ringing control circuit is equipped with connector relays which are operated by a switching network controller to connect active ringing power and a shared called station answer detector through a trunk and line link network to a called station.

While the foregoing Feiner arrangement has proven technically reliable for many commercial applications, it teaches that each ringing control circuit be associated with trunk circuits and that it be controlled by a switching network controller for performing the ringing job over connections through the switching network. In certain present day switching systems, such as time division systems, the foregoing Feiner teaching does not find practical utility because it is not usually feasible to switch ringing current from trunk circuit appearances in the network through time slot switching elements to called lines. Moreover, the individual Feiner ringing control circuits require circuitry which self-determines the active ringing interval and the disconnection of ringing from a call connection through the network. Such self-determinations are made by a timer arrangement in the ringing control circuits.

Another Feiner invention disclosed in A. Feiner (Case 32), U.S. patent application Ser. No. 521,734, filed concurrently herewith, sets forth ringing control circuitry which utilizes the shared ringing loop current detector technique for single and multiphase ringing and which advantageously does not require the switching of ringing power through the communication switching network. It is therefore suitable for use in time division systems and other such systems utilizing low level elements for communication switching. In the latter Feiner arrangement, a group of the line circuits time share a single call answer detector which is connectable and disconnectable from called lines via the line circuits in response to signals from common control equipment. Advantageously, the duration of each connection of the answer detector to a called line is determined solely by the common control equipment for a full active ringing interval. This centralized determination eliminates the necessity of circuitry in individual line circuits for the same function and reduces the need for prior art common control circuit and scanner interrogation of the line circuits to determine whether the answer detector has been disconnected from a called line upon termination of active ringing.

Each of the line circuits is illustratively connected permanently to the shared detector and is equipped to connect it to a called line at the beginning of an active ringing interval and to disconnect the detector from the line at the end of that interval and during the entire silent interval. The Feiner arrangement advantageously is also equipped to bridge a line supervisory relay onto the called line for sensing a called station answer during the silent interval and thereupon to control the tripping of ringing.

In view of the foregoing, there has existed a recognized need in the art for improved arrangements for line circuits to control the ringing functions in systems utilizing shared ringing loop current detectors and in which the ringing is switched over paths independent of the main communication switching network.

SUMMARY OF THE INVENTION

The foregoing need is fulfilled in accordance with an illustrative embodiment of our invention which provides improved ringing control circuitry for line circuits for use, by way of example, in a time division switching system. The illustrative embodiment utilizes a ringing loop current detector which is time shared by a plurality of line circuits as in the ringing arrangements disclosed in the aforementioned Feiner patent application.

Each one of the line circuits comprises switch means which is operable for connecting ringing power from a shared one of the detectors through that one line circuit to a called line and which is releasable for disconnecting the ringing power from that line. The line circuit is advantageously equipped with control means responsive to a receipt of control signals supplied by common control equipment for operating the switch means during each active ringing interval and releasing the switch means during each silent interval.

It is a feature of our invention that the switch means includes an electromechanical switch and the control means includes a bistable circuit arrangement responsive to control signals from the control equipment for controlling the operation and release of the electromechanical switch.

According to another aspect of our invention, the electromechanical switch comprises a ring relay and the bistable circuit arrangement includes a flip-flop circuit settable for operating the relay to connect ringing power from the shared one of the detectors to the called line and resettable for releasing the relay to disconnect the ringing power from the line. The circuit arrangement further includes logic means including a line circuit select gate together with set and clear gates for controlling the setting and resetting of the flip-flop circuit.

An important feature of our invention is that the flip-flop circuit further includes additional means for resetting the flip-flop circuit immediately upon detection by the shared detector of an answer signal from the called line and during a connection of the ringing power to that line. This resetting operation causes the immediate release of the ring relay for disconnecting active ringing power from the called line and thereby ensures that the called party does not receive objectionable ringing signal through the telephone receiver. An advantage of this resetting arrangement is that the shared detector provides a common reset signal to all flip-flop circuits in the same group of line circuits.

Another feature is that the ring relay is effective to connect a line supervisory relay to a called line during each silent interval of a ringing phase. The supervisory relay illustratively senses loop current as a call answer signal and then generates a call answer status signal for informing the common control equipment to terminate further active ringing operations.

DESCRIPTION OF THE DRAWING

The foregoing features and advantages, as well as others, of this invention can be more fully understood from a reading of the following description with reference to the drawing in which.

The equipment illustrative of the principles of this invention has been designed for incorporation, by way of example, into a program controlled pulse amplitude modulation time division switching system of the type essentially as disclosed in the D. J. H. Knollman U.S. Pat. No. 3,914,559 issued Oct. 21, 1975 and assigned to the same assignee. Related subject matter is also disclosed in A. Feiner U.S. patent application Ser. No. 521,734 filed Nov. 7, 1974 concurrently herewith, and J. F. O'Neill U.S. Pat. No. 3,916,118 issued Oct. 18, 1975 and assigned to the same assignee. It is particularly concerned with the shared ringing loop current detector, the line circuit ringing control circuitry and a ring relay switching arrangement associated with the line circuit hybrid. The other equipment elements are neither shown nor described in detail herein, except where necessary for a complete understanding of the construction and operations of our illustrative ringing equipment. Reference is also made to the J. M. Elder, Jr., U.S. Pat. No. 3,934,099 issued Jan. 20, 1976 and assigned to the same assignee, which discloses details of the hybrid suitable for use in our illustrative telephone system.

DETAILED DESCRIPTION

Figure 1:
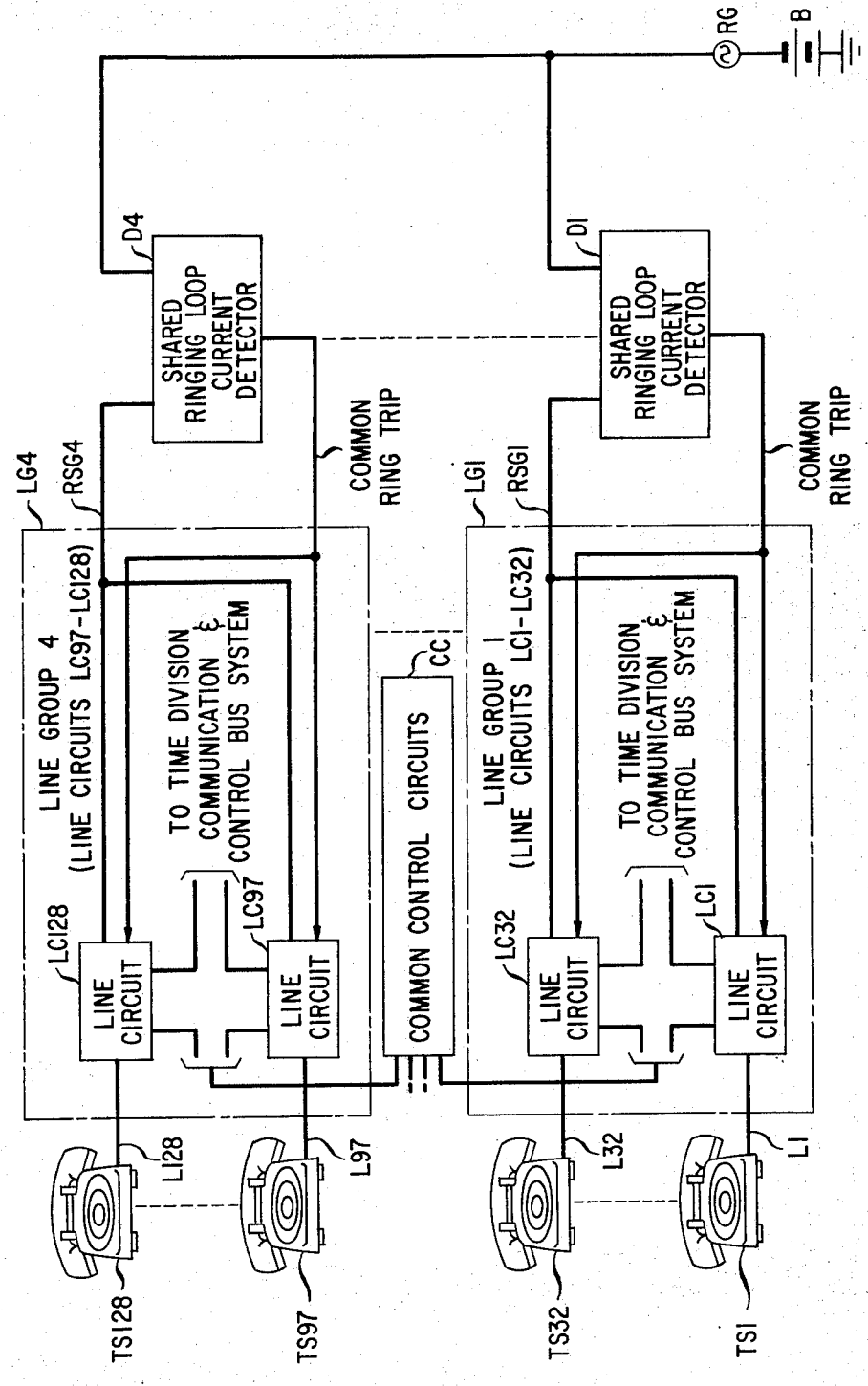
FIG. 1 is a block diagram of a time division switching system employing ringing loop current detectors shared by groups of telephone line circuits.

In FIG. 1, the illustrative TDM system comprises a plurality of telephone stations TS1–TS128 each of which is equipped with a conventional telephone ringer (not shown). The stations are connected over respective telephone lines L1–L128 to TDM line circuits LC1–LC128.

According to our exemplary embodiment, the line circuits are divided into four line groups LG1–LG4 each of which comprises 32 line circuits. Illustratively, line group LG1 comprises the line circuits LC1–LC32 and group LG4 comprises circuits LC97–LC128. Each of the line circuits is connected to a time division communication and control bus system and is equipped with circuitry which is activated over the bus system by common control circuits CC for controlling incoming telephone call ringing and the establishment, supervision and termination of time slot switch connections for transmit and receive TDM communication on such calls.

Ringing current for alerting a called one of the stations TS1–TS128 to an incoming cell is, by way of example, supplied to the line circuits LC1–LC128 from a common ringing generator RG. It continuously furnishes nominal 20 cycle, 120 volts superimposed on negative 48 volts from battery B. Generator RG is advantageously permanently connected via four ringing loop current detectors D1–D4 to the line circuits in the respective line groups LG1–LG4. Each one of the detectors D1–D4 is individual to one of the groups LG1–LG4 and is shared by all line circuits in that one group for sensing during ringing a loop current flow resultant from a called station answering (telephone off-hook) of an incoming call. To elaborate, detector D1 is shared by line circuits LC1–LC32 and detector D4 is shared by circuits LC97–LC128. Advantageously, each of the detectors D1–D4 is utilized for sensing loop current for four different phases of ringing. Detectors D1–D4 are connected to the line circuits of the respective line groups via the leads RSG1–RSG4.

Figure 2:
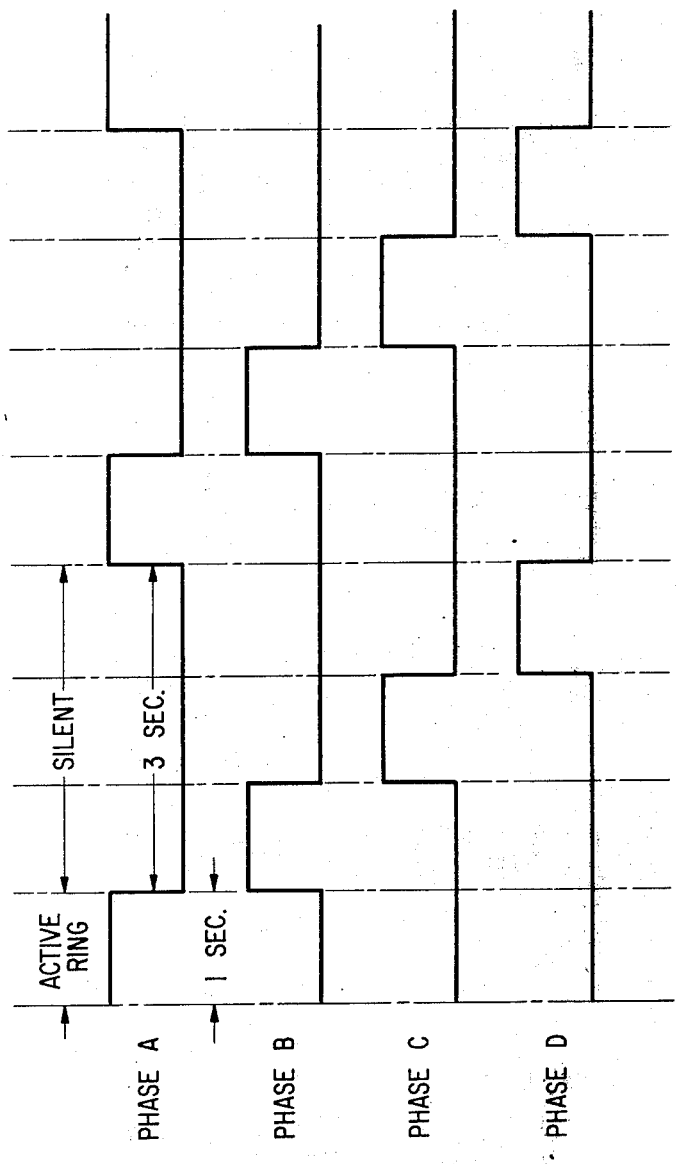
FIG. 2 is a sequence diagram which depicts four illustrative phases of ringing assigned by a time division processor for operating the ringing circuitry of FIG. 2.

Each of the line circuits LC1–LC128 is further equipped according to our invention with ringing control circuitry (FIG. 3) which is responsive to signals received via the bus system from the common control circuits CC for connecting and disconnecting active ringing current to and from a respective called one of the lines L1–L128. The control circuit CC advantageously partitions the operation of the ringing circuitry for a line circuit to provide four phases of ringing. As depicted in FIG. 2, the four phases A–D each comprise a cyclically recurrent 1-second active period of ringing followed by a 3-second silent interval under control of the control circuit CC. The active period of ringing in each of the phases A–D is time spaced and arranged uniquely to occur while the other three phases are in respective silent intervals as shown in FIG. 2.

Our exemplary embodiment permits a single ringing loop current detector D1 to be shared among all lines L1–L32 within line group LG1 because only one such line is actively rung at a time during an assigned one of the ringing phases A–D. The detector is operable during the assigned phase to detect an answer signal from only the one line being rung. Our ringing system is further arranged so that illustratively a maximum of four different lines in the same line group, such as group LC1, may be sequentially rung during each of the successive phases A–D. Advantageously, the ringing loop current detector shared by those four lines is sequentially connectable individually to those lines for sensing a called station answer signal during each of the active ringing intervals of all four phases A–D. Moreover, our ringing circuitry is designed so that one line in each of the line groups LG1–LG4 can be concurrently rung during each of the phases A–D. Accordingly, in the illustrative embodiment, a maximum of four lines in each of the four line groups LG1–LG4, that is a total of 16 different lines, may be rung in the four phases A–D, and one line in each line group, or a total of four lines, may be rung in each of the phases A–D.

Figure 3:
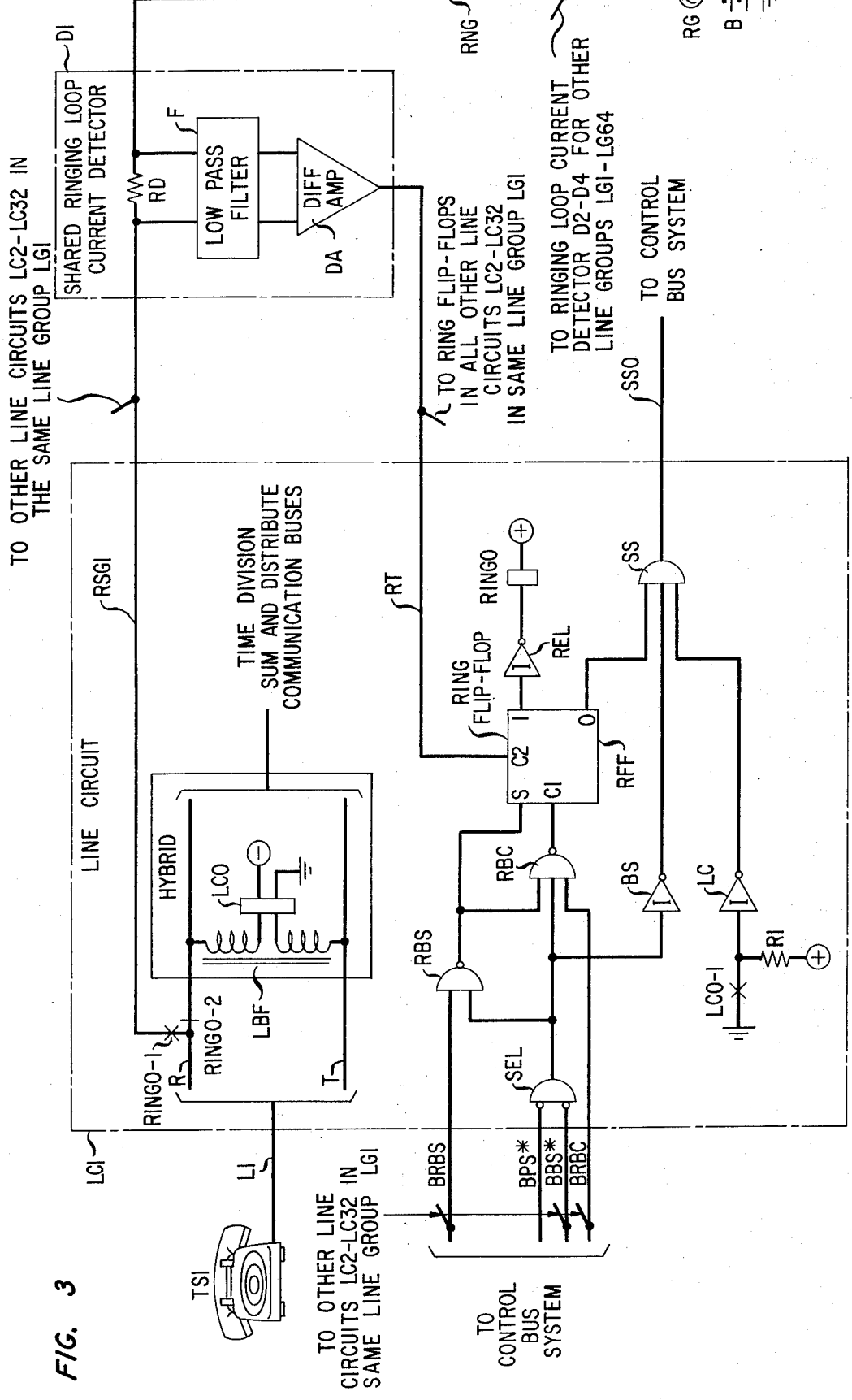
FIG. 3 shows schematically a ringing generator and a shared ringing loop current detector connected to a single line circuit having ringing control circuitry, as well as an active hybrid for TDM call communications.

In FIG. 3, the ringing arrangement for a single line group LG1 is depicted utilizing a single line circuit LC1. The latter circuit is equipped with a ring relay RINGO which is operable in response to signals received over the system buses from the common control circuits CC for connecting ringing current on lead RSG1 in any of the four phases A–D via contact RINGO-1 to the line L1 and station TS1. The control circuits CC effect the operation of relay RINGO at the beginning of an active one-second ringing interval of a selectably assigned one of the phases A–D and causes its release to terminate that active interval and then begin a 3-second silent interval for the same phase. This ringing operation is recurrent until either the called station answers or the incoming call to that station is abandoned.

Referring to FIG. 3, a fundamental building block for the ringing control circuitry of line circuit LC1 includes a ring flip-flop RFF. It comprises conventional inputs and outputs, namely: a set input S; a pair of clear, or reset, inputs C1 and C2; and "1" and "0" outputs.

Flip-flop RFF in its idle, or cleared, state rests with a logic 1 at its 0 output and a logic 0 at its 1 output. As a consequence, relay RINGO which is connected to the 1 output of flip-flop RFF via an inverter amplifier REL, is released and withholds ringing power from line L1 at its contact RINGO-1.

When station TS1 is to be rung in response to a receipt of an incoming call, the common control circuits CC select the appropriate one of the phases A–D and apply line selection and ringing control signals to the bus system for activating flip-flop RFF. The line selection and ring control process involves a selection gate SEL, a ring bus set gate RBS and a ring bus clear gate RBC. Gate SEL is an AND gate which is in response to a receipt of coincident enabling LOW signals at its input from select leads BPS* and BBS* for producing an output for partially enabling gates RBS and RBC. Concurrently, gate RBC, an inverting AND gate, is responsive to a receipt of a disabling signal on lead BRBC for precluding a subsequent clearing of flip-flop RFF by gate RBC during an active interval of an assigned one of the ringing phases A–D. At the same time, gate RBS, an inverting AND gate, is responsive to a receipt of an enabling signal on lead BRBS for producing an output signal which further disables gate RBC and simultaneously sets flip-flop RFF for generating a logic 0 at its 0 output and a logic 1 at its 1 output. The latter action causes the operation of relay RINGO via an inverting amplifier REL. In operating, relay RINGO initiates an active interval of ringing on line L1 by closing its contact RINGO-1 to extend the ringing power on lead RNG through a resistor RD of detector D1 and lead RSG1 to the ring lead R of line L1 for ringing station TS1. Active ringing continues for the full 1-second period unless the called station answers within that time.

If station TS1 does not answer the call before the expiration of ringing, the common control circuits CC control the deactivation of the ring bus set gate RBS and the activation of the ring bus clear gate RBC. The control circuits do so by applying concurrent signals to the BRBS and BRBC input leads to gates RBS and RBC. The activation of gate RBC generates an output signal which is applied to the clear input C1 of flip-flop RFF for resetting the flip-flop. In resetting, flip-flop RFF switches its 1 output to a logic 0 for effecting a release of relay RINGO via amplifier REL. Upon releasing, relay RINGO opens its contact RINGO-1 for terminating the active period of ringing on line L1 and entering a 3-second silent period.

During the silent interval, the line circuit LC1 monitors the called station TS1 to detect a called party answer. Following such a detection, our exemplary ringing control circuitry signals the common control circuits CC to terminate further active ringing of station TS1 and to effect further operations of line circuit LC1 for call communication in an available one of the TDM time slots.

The monitoring action is performed by a loop current supervisory relay LCO which is connected across the tip and ring leads via contact RINGO-2 and inductor LBF upon the aforementioned release of relay RINGO. Thereafter, relay LCO is operative in response to current flow over the tip and ring loop resultant from the removal of the telephone handset from its cradle and the switchhook contact closure. Upon operating, relay LCO closes its contact LCO-1 for applying to an input of an inverting amplifier LC, a ground potential instead of the positive potential via resistor R1. As a consequence, amplifier LC produces an output which enables a switchhook status AND gate SS. The enabling of gate SS, as shown in FIG. 3, is controlled by coincident input signals received from amplifier LC, the 0 output of the reset flip-flop RFF, and an inverter amplifier BS. The latter gate produces an enabling output signal as a result of the aforementioned selection signal applied by the common control circuit CC to leads BBS* and BPS*. Upon enablement, gate SS generates an output signal on lead SSO for informing the common control circuits that the incoming call has been answered and active ringing is no longer needed for station TS1.

In the event that a called party answer signal is not detected within the silent period following an immediately previous active ringing interval, the common control circuits CC effect the reoperation of relay RINGO, as already described, again to apply active ring current to line L1 for a one-second interval. As priorly explained, the relay RINGO is operated in response to the setting of flip-flop RFF and by its 1 output signal activating amplifier REL. Flip-flop RFF is set under control of gates RBS and RBC which are respectively enabled and disabled by concurrent signals received over leads BRBS and BRBC from the common control circuits.

According to our exemplary embodiment, when a called party answers at station TS1 during the active ringing interval, ringing is tripped and thereby the active ringing interval terminated under control of the shared ringing loop detector D1. The ring tripping action is speedily performed to preclude the transmission of ringing through the receiver of the telephone to the answering party. The latter detector senses a change in D.C. (direct current) loop current flow in the series path from battery B, ringing generator RG, leads RNG and RSG1, contact RINGO-1 and the L1 line loop including station TS1.

As illustrated in FIG. 3, the detector comprises a ringing detector resistor RD serially connected with leads RNG and RSG1. It also includes a low pass filter F which rejects, or blocks, 20 cycle ringing signals from being applied to a differential amplifier DA and enables DC loop current flow signals to be developed across resistor RD and passed to amplifier DA. Rejection of the 20 cycle signals is needed to preclude undesired ring tripping. Amplifier DA senses current changes developed across resistor RD by loop current flow resultant from a called station answer. Amplifier DA then generates an output ring trip signal on lead RT. The latter signal immediately controls a resetting of flip-flop RFF and, in turn, the release of relay RINGO by being applied over lead RT directly to the clear input C2 of flip-flop RFF. As indicated in FIG. 3, lead RT is multiple connected to all of the corresponding clear inputs C2 of flip-flops RFF in all other line circuits LC2–LC32 in the same line group which shares detector D1. However, as mentioned previously, only the flip-flop RFF is reset by the signal on lead RFF inasmuch as our illustrative ringing system only allows one line circuit within the same group to be rung within a selectably assigned one of the phases A–D.

When relay RINGO releases for ring tripping, it opens its contact RINGO-1 to disconnect ringing current on lead RSG1 from line L1. At the same time, relay RINGO closes its contact RINGO-2 and connects relay LCO across the tip and ring leads for operation of that relay by the loop current on line L1 caused by the closed switchhook of telephone TS1 upon the called party answer. In operating, relay LC closes its contact LCO-1 for activating amplifier LC and thereby enabling gate SS to supply a switchhook status signal for station TS1 to lead SSO for informing the common control circuits that the incoming call has been answered. The common control circuits thereupon proceed to establish TDM call conversation connections within an available time slot of the time division frame as described in the aforementioned O'Neill and Knollman patent applications.

It is to be understood that the hereinbefore described arrangements are illustrative of the application of principles of our invention. In light of our teaching, it is apparent that numerous other arrangements may be devised by those skilled in the art without departing from the spirit and scope of our invention.

What is claimed is:

1. For use in a communication system having a group of communication line circuits and incoming call signaling means, means connecting incoming call alerting signals from said signaling means to said line circuits and said means connecting being shared by said circuits for detecting call answer signals for each of said circuits, and each one of said line circuits having signaling control means activated in response to a receipt of control signals for connecting an incoming call alerting signal from said detecting means to a called line means subsequently responsive to said detecting means detection of an answer signal on said called line for deactivating said control means to disconnect said alerting signal from said called line, and the invention wherein said signaling control means in each one of said line circuits includes a switching device operable for connecting said incoming call alerting signal from said detecting means to said called line and bistable means activated in response to said control signals for operating said switching device to connect said alerting signal to said called line, and said detecting means being subsequently operated in response to said answer signal for deactivating said bistable means to release said switching device and thereby to disconnect said alerting signal from said called line.

2. The invention of claim 1 wherein said control signals define active and silent periods of alerting signals, and said signaling control means further comprises logic means responsive to a receipt of control signals for activating and deactivating said bistable means to operate said switching device and thereby apply said alerting signal for an active period of said call signaling and to release said device for a silent period of said signaling.

3. The invention of claim 2 wherein said signaling control means further comprises logic apparatus operable in response to said control signals for activating said bistable device to operate said switching device and connect said called line for said active period of said alerting signaling and a logic device controlled by said logic apparatus and being responsive to said control signals for deactivating said bistable means to release said switching device to disconnect said alerting signal from said line for said silent period of signaling.

4. The invention of claim 3 wherein each one of said line circuits further comprises means jointly controlled by said bistable means, switching device and said called line for generating a call answer status signal.

5. The invention of claim 4 wherein said call answer status signal generating means comprises means connectable to said called line upon each said release of said switching device for sensing a call answer signal on said line, means controlled upon each said deactivating of said bistable means and responsive to a sensing of a call answer signal by said sensing means for producing said call answer status signal.

6. The invention of claim 5 wherein each one of said line circuits further comprises means responsive to a receipt of signals selecting said one of said line circuits for incoming call signaling for providing a signal to enable said logic apparatus and logic device to control said activating and deactivating of said bistable means and further to enable said call answer status signal producing means to produce said status signal.

7. For use in a communication system having a group of communication line circuits and ringing power supply means, the invention comprising a single ringing loop current detector permanently connected concurrently to each of said line circuits during ringing and communication intervals and for detecting loop current flow over a called line during an application of ringing power from said supply means to said called line, means in each one of said line circuits responsive to a receipt of control signals for controlling a connection of said detector through said one of said line circuits to a called line connectable thereto, and switch means controlled by said controlling means for connecting said detector and said ringing power supply means to said called line connectable to said one of said line circuits.

8. The invention in accordance with claim 7 wherein said controlling means comprises a bistable circuit activatable in response to a receipt of ringing control signals for operating said switch means to connect said detector and said ringing power supply means serially with said called line connectable to said one of said line circuits and being further deactivatable in response to ringing disconnect signals for releasing said switch means to disconnect said detector and said supply means from said called line connectable to said one of said circuits, and logic means responsive to said ringing control and disconnect signals for activating and deactivating said bistable circuit, and wherein said bistable circuit further includes means responsive to a receipt of a signal generated by said detector upon detection of loop current flow over said called line connectable to said one of said line circuits for deactivating said bistable means.

9. For a communication system having plural groups of communication line circuits, ring current supply means, a plurality of call answer signal detectors connected to said supply means for extending ringing power to said line circuits and common control means for supplying signals to said line circuits for selectively controlling a generation of plural phases of ringing through said line circuits to respective called lines, each of said phases having an active ringing interval followed by a silent interval and being time spaced so that each said active ringing interval for each said phase occurs during a silent interval of each of the other of said phases, said controlling signals being supplied so that each said phase is concurrently generatable for only one of said line circuits in each of said groups, the improvement comprising said line circuits in each one of said groups sharing an individual one of said detectors for detecting incoming call answer signals, each one of said line circuits including means operated in response to said supplied controlling signals for connecting incoming call ringing power for one of said phases from a respective shared one of said detectors through said one of said line circuits to a called line, means subsequently activated by said shared one of said detectors upon a detection of a call answer signal received from said called line through said one of said circuits during an active ringing interval of said one of said phases for releasing said connecting means to terminate said last-mentioned active ringing interval and wherein each of said detectors detects a loop current call answer signal on a respective called line during an active ringing interval of each of said phases, and said connecting means of each one of said line circuits comprises switch means operable for connecting ringing power from a respective shared one of said detectors through said one of said line circuits to a called line and being releasable for disconnecting said ringing power from said last-mentioned line, and control means responsive to a receipt of said supplied control signals for operating said switch means during an active ringing interval of one of said phases and releasing said switch means during a silent interval of said last-mentioned one of said phases.

10. The invention of claim 9 wherein said switch means includes an electromechanical switch, and said control means includes a bistable circuit arrangement responsive to said receipt of said supplied signals for controlling the operation and release of said electromechanical switch.

11. The invention of claim 10 wherein
said electromechanical switch comprises a relay, and said bistable circuit arrangement includes
a flip-flop circuit settable for operating said relay to connect said ringing power from said shared one of said detectors to said called line and being clearable for releasing said relay to disconnect said ringing power from said called line, and
logic means responsive to a receipt of said supplied control signals for controlling the setting and clearing of said flip-flop circuit.

12. The invention of claim 11 wherein said logic means includes set and clear gate means for controlling said setting and clearing of said flip-flop circuit.

13. The invention of claim 12 wherein said logic means further includes a gate circuit responsive to a receipt of line circuit select signals from said common control circuits for cooperating with said set and clear gate means to control said setting and clearing of said flip-flop circuit.

14. The invention of claim 11 wherein said flip-flop circuit further includes means for clearing said flip-flop circuit immediately upon a detection of an answer signal from said called line during a connection of said ringing power thereto.

* * * * *